Figure 1:
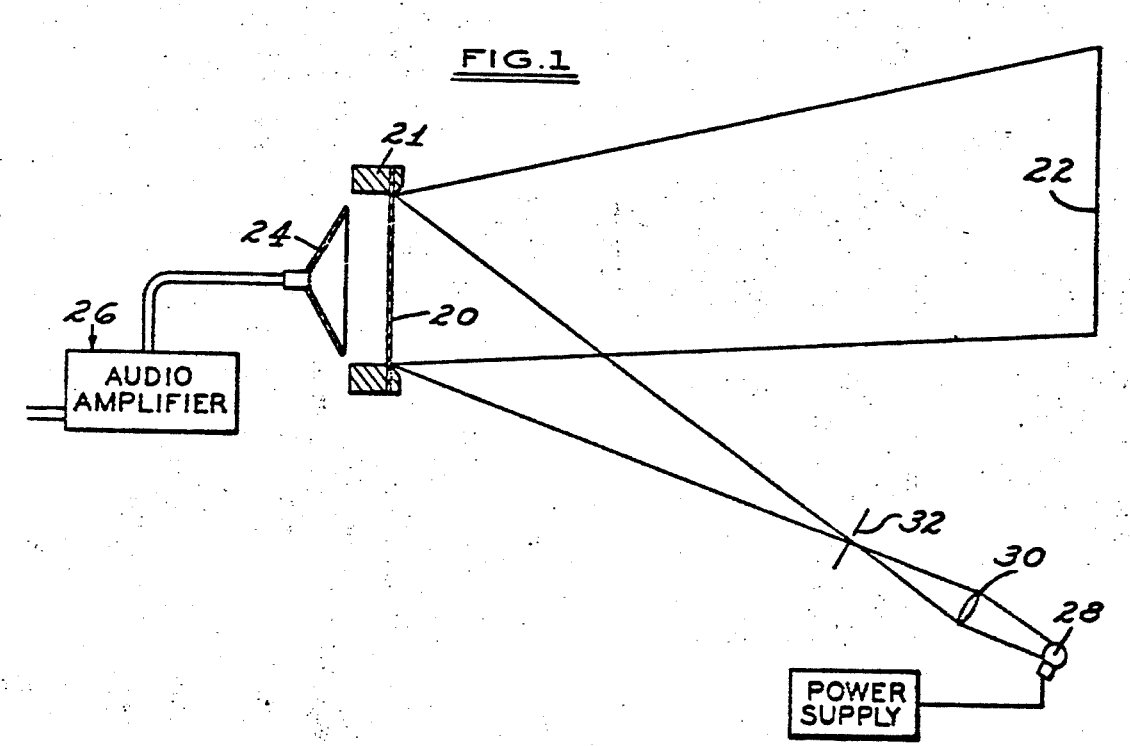

United States Patent [11] 3,590,681

| [72] | Inventor | Lloyd G. Cross<br>Ann Arbor, Mich. |
|---|---|---|
| [21] | Appl. No. | 779,510 |
| [22] | Filed | Nov. 27, 1968 |
| [45] | Patented | July 6, 1971 |
| [73] | Assignee | Sonovision, Inc.<br>Ann Arbor, Mich. |

[54] APPARATUS FOR PRODUCING A VISUAL DISPLAY
4 Claims, 13 Drawing Figs.

[52] U.S. Cl. .................................................. 84/464
[51] Int. Cl. ................................................. A63j 17/00
[50] Field of Search ........................................ 84/464

[56] References Cited
UNITED STATES PATENTS

| 2,189,311 | 2/1940 | Dimmick | 84/464 |
| 2,411,804 | 11/1946 | Plebanek | 84/464 |
| 3,140,347 | 7/1964 | Cohen | 84/464 |

*Primary Examiner*—Richard B. Wilkinson
*Assistant Examiner*—Lawrence R. Franklin
*Attorney*—Barnes, Kisselle, Raisch & Choate ABSTRACT: A device for producing a visual display which is influenced by sound waves including a reflective diaphragm subject to vibration by reason of a sound signal from a source such as music and also subject to a light source reflected from the diaphragm to an appropriate screen wherein the light source which may include a laser light is influenced by the vibrations of the diaphragm to create distinctive patterns on the screen responsive to tones and combinations of tones, it being the purpose to produce a light pattern wherein the dominant spatial frequencies correspond to the dominant sound frequencies as distinguished from color and intensity.

PATENTED JUL -6 1971

3,590,681

SHEET 1 OF 3

INVENTOR
LLOYD G. CROSS

BY

Barnes, Kisselle, Raisch & Choate

ATTORNEYS

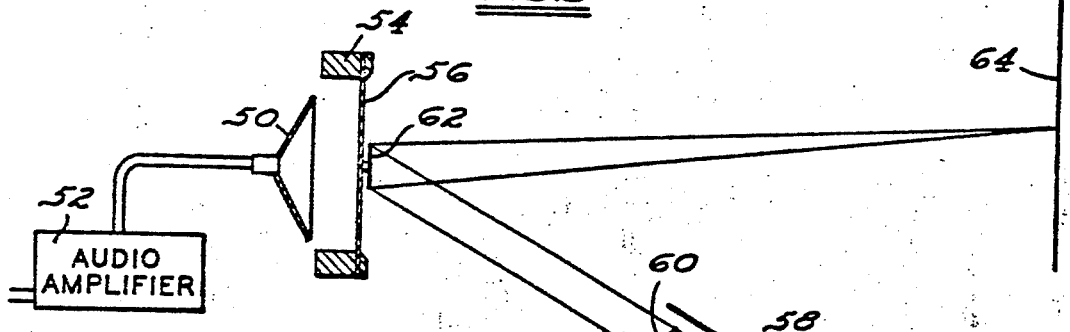
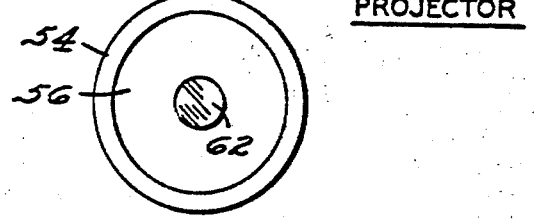
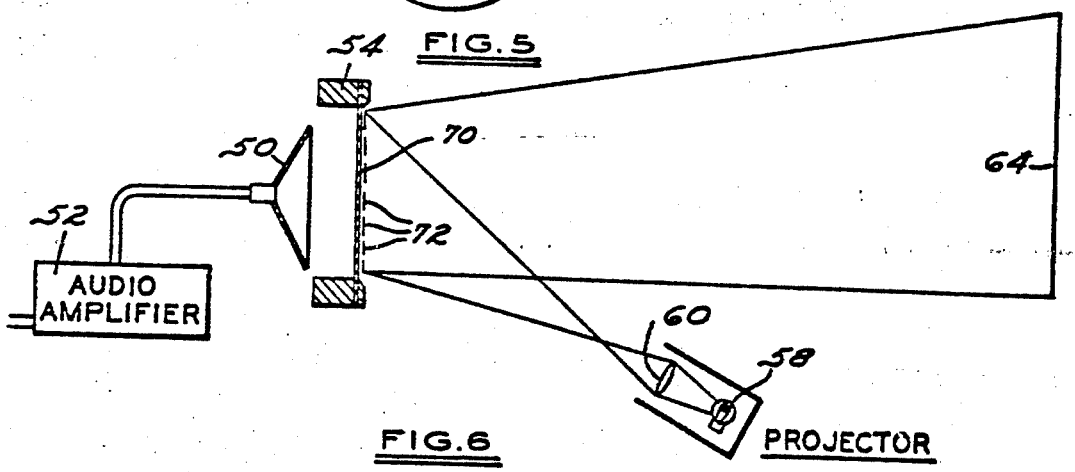
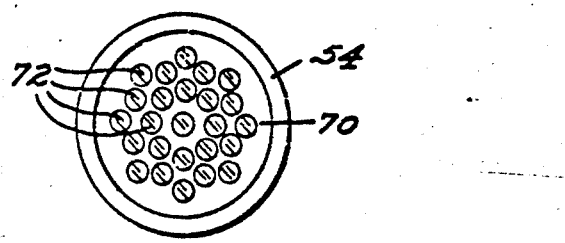

INVENTOR
LLOYD G. CROSS
BY
Barnes, Kisselle, Raisch & Choate
ATTORNEYS

APPARATUS FOR PRODUCING A VISUAL DISPLAY

This invention relates to an apparatus for producing a visual display which is directly responsive to a sound signal created by a source such as music.

It is an object of the invention to provide a visual display on an appropriate screen which can be viewed by an audience and to create on the screen a time-varying light pattern which is well coordinated with a sound such as music or speech.

It is an object to produce a unique and reproducible light pattern for each tone or combination of tones presented to the apparatus in the form of time-varying electrical signals which correspond to sound signals.

It is a further object to produce a light pattern wherein the geometry or spatial relationships of the pattern correspond to the sound signal as distinguished from the color or intensity of the light pattern.

It is a further object to provide a light pattern wherein the dominant spatial frequencies correspond to the dominant frequencies in the sound or music being utilized to create the visual effect. By the term "spatial frequency" is meant the number of light-to-dark alternations observed per unit distance in a regularly varying light pattern while traversing the pattern in any one direction.

Other objects and features of the invention will be apparent in the following description and claims wherein the principles of operation are described and the best mode contemplated for the invention is disclosed.

DRAWINGS accompany the disclosure and the various views thereof may be briefly described as:

FIG. 1, a diagrammatic view of an audiovisual system showing the basic components.

Figure 2:
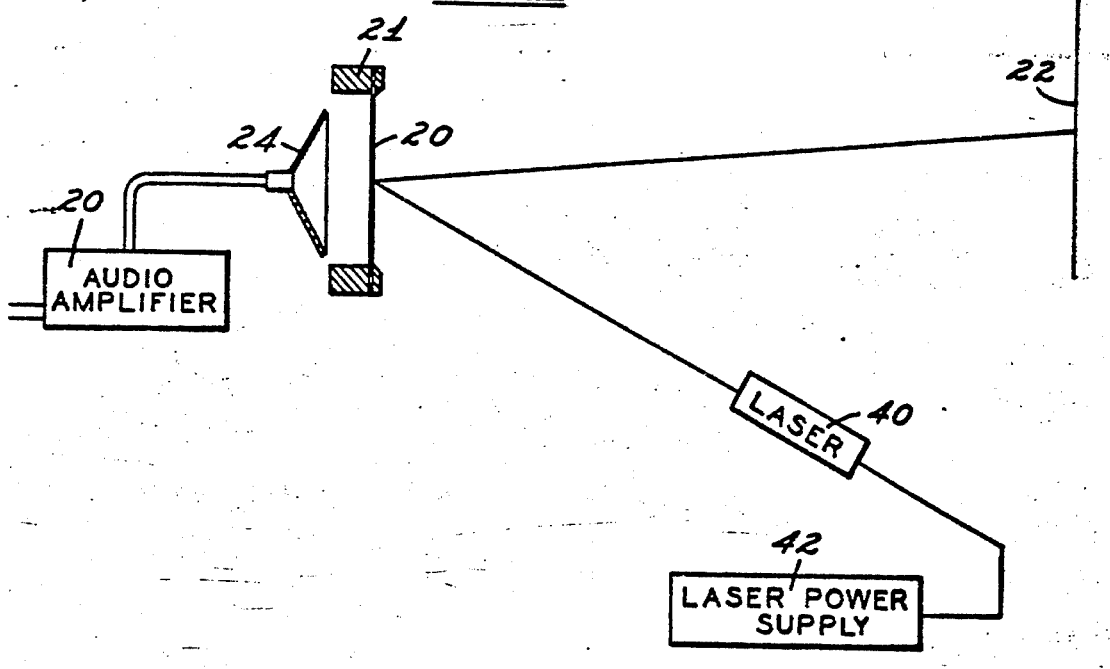

FIG. 2, a view similar to that of FIG. 1 utilizing a laser supply.

FIG. 3, an audiovisual system wherein a small reflector carried by a diaphragm is utilized.

FIG. 4, an elevation of a diaphragm system utilizing a small central reflector.

FIG. 5, a modified system utilizing a plurality of reflectors on a diaphragm.

FIG. 6, an elevation of a diaphragm showing a plurality of reflectors.

Figure 7:
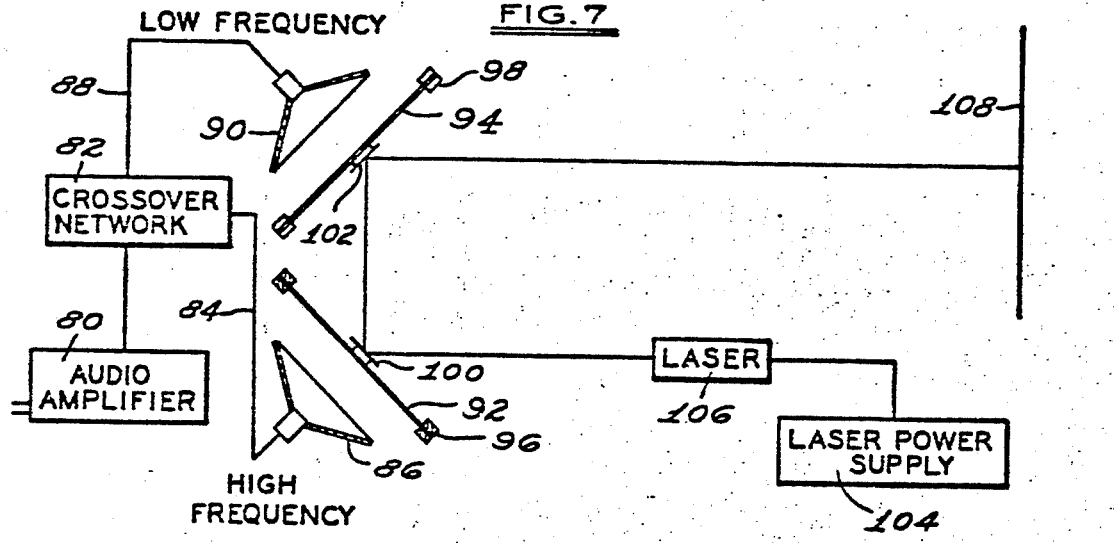

FIG. 7, a system utilizing a separate diaphragm for different frequencies.

Figure 8:
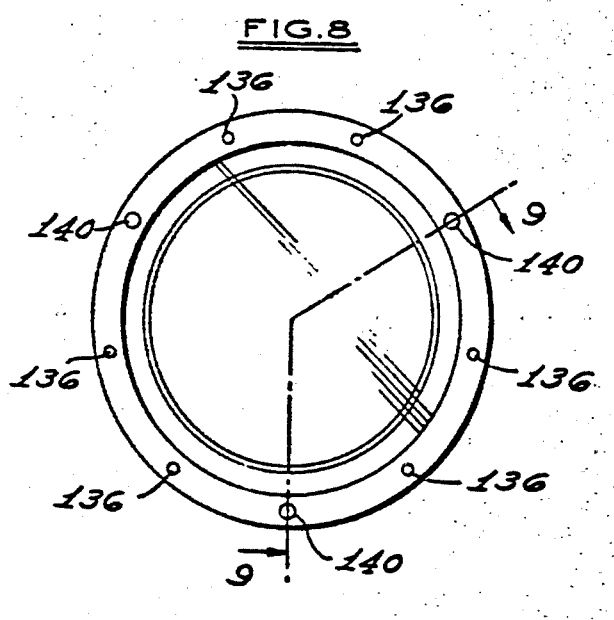

FIG. 8, an elevation of a diaphragm construction.

Figure 9:
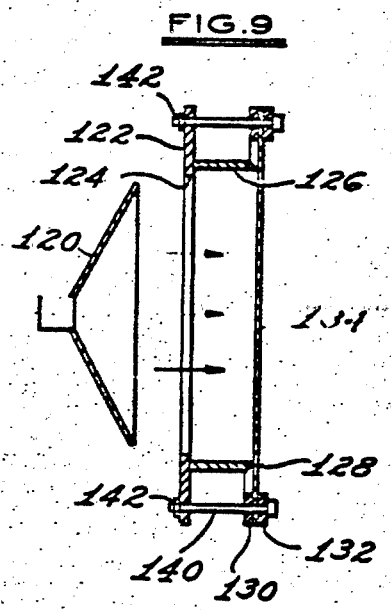

FIG. 9, a sectional view on line 9—9 of FIG. 8.

Figure 10:
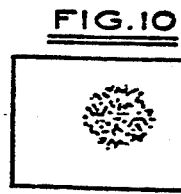

FIG. 10, a line drawing of a typical sound pattern on a display screen produced in accordance with the invention.

Figure 11:
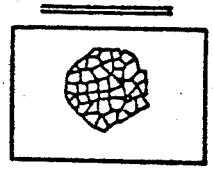

FIG. 11, a view of a pattern produced by a low frequency sound.

Figure 12:

FIG. 12, a view of a high frequency pattern utilizing a laser beam source.

Figure 13:
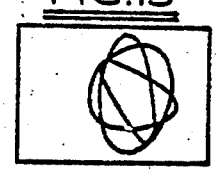

FIG. 13, a view of a low frequency pattern utilizing a laser source.

Referring to FIG. 1, an embodiment of the invention is illustrated wherein a diaphragm 20 is stretched in a suitable frame 21 and a speaker 24 is mounted concentrically with the diaphragm, this being the output speaker of an audio amplifier system shown generally at 26. The diaphragm is preferably a thin plastic membrane which has been provided with a vacuum deposit of reflective metal such as aluminum which has been vaporized and condensed on the thin plastic film to form a mirror surface. A number of thin plastic films may be utilized and one which has been found satisfactory is Saran material manufactured by Dow Chemical Co.

A light emitting source 28 can be any standard multi or monochromatic light source or, if desired, a mercury arc lamp or other high intensity light source. This passes through a lens 30 and an aperture 32 and is directed toward the mirror surface of the diaphragm 20 from which it reflects to a suitable screen 22 set up so that it may be viewed by an audience. The light projector will image the source 28 at a point in space given by the relation of $x = fl/l-f$ where $x$ equals the distance between the lens 30 and the image of the source. The focal length of the condensing lens is $f$ and it is located at a distance $l$ from the source.

The aperture 32 located at a distance $x$ from the lens with an effective diameter $p$ will limit the light projected onto the display and determine the resolution of the final pattern. From the aperture 32 the light will spread to fill the diaphragm 20 which is caused to vibrate in its characteristic modes of residence by sound pressure waves coming from the driving transducer 24. This can be simply a standard audio speaker which is excited by a conventional audio amplifier 26 receiving a sound signal from a microphone, record player, tape player or radio.

The vibrations in the membrane will distort the optical surface thereof, which in turn will produce characteristic light patterns on the screen 22. In general, low sound frequencies will produce low frequency vibrations in the diaphragm which will be converted to large patterns on the projection screen 22. Higher sound frequencies will produce correspondingly high frequency vibrations with smaller mode patterns and consequently finer patterns on the screen. A combination of sound frequencies will produce a combination of mode patterns and consequently a combination of corresponding light patterns on the screen. The physical mode patterns are determined by the properties of the membrane and the boundary condition of the membrane holder.

A representative line diagram of a pattern is shown in FIG. 10.

In FIG. 2, a modified system is shown having many of the same components as shown in FIG. 1 with the exception of the light source which in this case is preferably a neon laser 40 having a laser power supply 42. Since the laser beam is generally a very fine beam, it is directed to one point on the diaphragm 20 where the vibrations in the diaphragm will deflect the laser beam into spatial patterns on the screen 22. In the case, the pattern will appear to be a line figure because of the fact that the retinal retinal retention of the eye is much longer than the time required to scan an audio signal pattern. As an example, a sound signal at 400 cycles per second will scan a given pattern 40 times in 1/10 of a second which is the approximate time of retinal retention of the human eye.

In FIG. 3, another modification of the system is shown wherein a transducer in the form of a sound speaker 50 supplied by an audio amplifier 52 is positioned adjacent a diaphragm frame 54 which mounted a rubber diaphragm 56. A light source 58 is imaged by a lens 60 onto a small mirror 62 mounted on the rubber diaphragm 65 and this pattern is displayed on a screen 64. In this embodiment the use of a conventional light source will create a scanning effect similar to the pattern and the resolution of the display is given by the relationship $w_o = W_s l/r$ where $W_o$ = the width of the display line
$W_s$ = the width of the source
$l$ = the distance from the source to the lines
$r$ = the distance from the lens to the screen via the reflective path of mirror 62

In FIG. 5, another modification is shown. A system similar to FIG. 3 is illustrated, the difference being that the diaphragm 70 composed of a rubber or plastic material has applied thereto a plurality of small mirrors 72. These mirrors are preferably thin glass or plastic mirrors which are very light and these are attached to the diaphragm in a pattern as shown, for example, in FIG. 6.

In FIG. 7, an alternate laser system is shown wherein an audio amplifier system 80 feeds to a crossover network 82 which has a high frequency feedout 84 to a speaker 86 and a low frequency feedout 88 to a low frequency speaker 90. In front of each speaker are diaphragms 92 and 94 respectively held in frames 96 and 98, these diaphragms being disposed at 90° to each other and each carrying a small reflective mirror 100 and 102 respectively. In this system a laser-power supply 104 activates a laser 106 which directs a beam at mirror 100, this being reflected to mirror 102 and thence to a screen 108.

Thus, the beam is reflected off a diaphragm which is responding to high frequencies and then to and from a diaphragm which is responding to low frequencies. In this manner each diaphragm can be better engineered and less expensively produced to respond to a particular range of frequencies and the entire audio range of sound signals can be displayed on the screen 108.

FIGS. 8 and 9 show the construction of a diaphragm mount which can be used with any particular speaker 120. The diaphragm mount consists of a flat ring 122 which has an opening 124 therein. Mounted outside the opening is a small cylindrical ring 126 which is rigidly attached outside the boundaries of the opening 124, this cylindrical ring having a knife edge 128. A pair of flat rings 130, 132 are provided to capture the boundaries of a membrane 134 which can either be a plastic film as previously described or a rubber film. The rings 130 and 132 are preferably clamped together by screws 136 and the rings 130, 132 are then mounted on bolts 140 spaced 120° apart around the rings. These bolts 140 can draw the rings toward the plate 122 by tightening the nuts 142 to create any desired tension at the portion of the diaphragm which overlies the cylindrical ring 126. If a mirror surface is used with this system, the membrane is an optically smooth plastic sheet which has been provided with a mirror surface as described by conventional evaporation or plating techniques.

If the membrane is to be used as shown in FIGS. 4 and 6 with attached mirror surfaces, it will then be made of a thin rubber sheet preferably which is optically nonreflective, the thin glass or stiff plastic mirrors then being attached by an adhesive or other suitable means. The thin mirrors must of course, be light in weight so they will vibrate with the membrane itself.

It has been found that the use of the various systems described above creates a visual effect with certain definite spatial frequency patterns which represent the various frequencies of the sound source and the appearance of the patterns will, of course be timed in relation to the music or other sound which is being used as a vibrating source. Thus, a very pleasing visual effect which is constantly varying will meet the eye of the observer who can also be hearing at the same time the audio input. The device can also be enjoyed by persons who have hearing difficulties but who can feel the musical vibrations and observe the patterns on the screen.

The formula for the resonant frequencies of a circular membrane is given in the following equation:

$f_{mn} = (\sqrt{T/M}/_{2a}) B_{mn}$ where T is the tension in the membrane in dynes per centimeter, M is the mass per square centimeter, a is the radius of the membrane in centimeters and $B_{mn}$ are the $n^{th}$ ordinate values at which the $m^{th}$ bessel function of the first kind is equal to zero. Some computed values of $B_{mn}$ are given in equation as follows:

$B_{01}=0.7655$  $B_{02}=1.7571$  $B_{03}=2.7546$
$B_{11}=1.2197$  $B_{12}=2.2330$  $B_{13}=3.2383$
$B_{21}=1.6347$  $B_{22}=2.6793$  $B_{23}=3.6987$ Physically, $2m$ is the number of nodes (stationary points or lines) counted in a circular traversal of the membrane and n is the number of nodes encountered in a radial traversal of the membrane. This relationship roughly describes the surface of the membrane when resonating at the $mn^{th}$ frequency. For example, when $m=0$ and $n=1$, the membrane is shaped like a section of a sphere and when $m=0$, $n=2$, the membrane is shaped like a spherical surface with a large dimple in the center.

A light wave front reflecting off of a mirrorized resonant membrane from a point source will be focused and defocused by alternate areas of membrane. In general, any concave areas will focus the light and convex areas will defocus or spread the light. This will cause the light pattern to be brightened at the antinodes (points or lines of maximum deflection) of the membrane and darkened at the nodes. In this manner, a sound frequency is converted to a mechanical vibration of a mirrorized membrane which then generates a light pattern having a corresponding spatial frequency.

Additionally, if a narrow beam of light, such as a laser, is directed to one small area, compared to the area of the membrane, the deflection of that area will reflect the laser beam into a spatial pattern on the screen since the rate of membrane vibration is equal to the vibration of the sound, which is well above the flicker rate of the eye. The size of the pattern so produced will be proportional to the amplitude of the sound and the shape of the pattern will be a complex function of the sound. In general, however, the spatial frequency is obtained, if the pattern is generated into a generally circular pattern, by a low frequency sound and is then altered by a higher frequency sound into a wave form pattern in which the spatial frequency is proportional to the sound frequency.

FIGS. 10, 11, 12 and 13 show representative patterns for visual display. The line representations in these FIGS. are not as aesthetically pleasing as the actual moving display which is the output of the system but the patterns shown give some idea of the output. In FIGS. 10 and 11 are light patterns produced by high (~3000 c.p.s.) and low (~300 c.p.s.) frequency sound signals respectively from an audio frequency signal generator. The illumination of the diaphragm to produce the output in these FIGS. 10 and 11 was from a point arc source directed to a diaphragm as shown in FIG. 1, namely, a thin plastic sheet (Saran-Wrap) stretched over a 4 inch diameter ring. A rubber diaphragm can also be used in place of a plastic material. FIGURES 12 and 13 show line patterns produced by a high and a low frequency sound signal, respectively, mixing with an intermediate frequency sound signal. The illumination for the display of FIGS. 12 and 13 was a laser beam reflecting off a mirror mounted on a diaphragm as shown in FIG. 4.

What I claim as new is as follows:

1. An audiovisual system for a visual display of sound dynamics which comprises:
   a. an audio source,
   b. a relatively thin membrane positioned adjacent said source to be responsive to air disturbances from said source, said membrane having a reflective thereon,
   c. a laser light source directed toward said membrane adapted to be reflected from said membrane, and
   d. a display surface positioned to receive reflective light from said membrane, said light being displayed in patterns having a spatial frequency corresponding to sound disturbances acting on said membrane.

2. An audiovisual system for a visual display of sound dynamics which comprises:
   a. an audio source including an audio amplifier,
   b. a low frequency speaker and a high frequency speaker receiving the output of said audio amplifier, said speakers being positioned in spaced relation to each other,
   c. a relatively thin membrane mounted adjacent each speaker to be responsive to the sound waves emitted therefrom, said membranes being positioned at an angle to each other,
   d. a mirror surface carried by said membranes,
   e. a laser light source directed to one of said mirror surfaces at an angle wherein it will be reflected to the other of said mirror surfaces, and
   f. a display plane positioned to receive the multiple reflection from said other mirror surface wherein sound waves emitted from said speakers will influence the respective diaphragms and create a display of spatial frequencies on said display plane, said spatial frequencies being influenced by the vibrations of each of said membranes.

3. In a system for audiovisual appreciation of sounds such as music,
   a. means for creating a source of sound in the form of an audio amplifier and speaker system,
   b. a relatively thin membrane adapted to be responsive to the air disturbances created by said speaker,
   c. means forming a mirror surface on one side of said membrane,
   d. a laser light
   ror surface, and e. a display plane for receiving reflected light from said mirror surface wherein a person in a position to observe the display plane may also be in a position to hear the audio output of said speaker and observe spatial frequency light patterns of said display plane corresponding to the sound frequencies of said speaker.

4. A system for the enjoyment of sound by sensing the audio effect thereof and sensing simultaneously the visual effects thereof in a geometric spatial pattern comprising:
a. a source of musical sounds including a speaker outlet to create air vibrations which can reach the ear of an observer,
b. a membrane positioned in a relatively taut condition adjacent the speaker outlet wherein the membrane will be mechanically vibrated by the air vibrations of said speaker,
c. means forming a reflective surface on said membrane,
d. a laser light source directing a thin beam of light toward said membrane, and
e. an observation plane positioned to pick up the reflection of said beam from said membrane, wherein a light pattern will be displayed on said observation plane having dominant spatial frequencies which correspond to dominant sound frequencies of the musical sound emitted from said speaker.